United States Patent [19]

White

[11] 4,210,340
[45] Jul. 1, 1980

[54] HEIGHT-ADJUSTING ASSEMBLY FOR IMPLEMENT WHEELS

[75] Inventor: Kenneth W. White, Bridgeton, Mo.

[73] Assignee: Atlas Tool & Manufacturing Co., St. Louis, Mo.

[21] Appl. No.: 902,868

[22] Filed: May 4, 1978

[51] Int. Cl.² ............................................. B62D 21/18
[52] U.S. Cl. .................................................. 280/43.17
[58] Field of Search ................. 280/43.13, 43.1, 43.17, 280/43

[56] References Cited

U.S. PATENT DOCUMENTS

| | | | |
|---|---|---|---|
| 1,482,954 | 2/1924 | Tideman | 280/43 X |
| 2,172,973 | 9/1939 | Hays et al. | 280/43 X |
| 2,381,202 | 8/1945 | Bowen et al. | 280/43 |
| 2,724,519 | 11/1955 | Hayes | 280/43 |
| 2,986,405 | 5/1961 | Winton | 280/43.13 |
| 3,357,715 | 12/1967 | Plamper et al. | 280/43.13 |
| 3,667,774 | 6/1972 | Selley | 280/43.17 |
| 4,105,218 | 8/1978 | Newell | 280/43.17 X |

Primary Examiner—John J. Love
Assistant Examiner—Norman L. Stack
Attorney, Agent, or Firm—Cohn, Powell & Hind

[57] ABSTRACT

A height-adjusting assembly for wheels of an implement such as a tiller having an implement handle attached to a base and extending upwardly and rearwardly from the base, and having an adjustment bar for the wheels disposed adjacent the bracket. A locking mechanism selectively interconnects the adjustment bar and bracket, and includes a remote control wheel-adjusting handle movably mounted on the implement handle and having a manually-actuated portion remote from the connection of the bar and bracket for selectively fixing the wheels at a predetermined adjusted height. The locking mechanism includes a lock pin movably mounted on the bracket and selectively connected to the bar, and the wheel-adjusting handle includes an elongate rod having one end connected to the lock pin, the other rod end providing the remote manually-actuated portion. The bar includes a plurality of longitudinally spaced apertures, the lock pin being selectively withdrawn from and inserted in the apertures upon actuation of the elongate handle rod. A compression spring between the bracket and lock pin tends to urge the pin into the bar apertures. The remote manually-actuated portion of the handle rod is located adjacent a hand-gripping assembly at the top of the implement handle.

1 Claim, 3 Drawing Figures

HEIGHT-ADJUSTING ASSEMBLY FOR IMPLEMENT WHEELS

BACKGROUND OF THE INVENTION

This invention relates generally to an improved height-adjusting assembly for implement wheels, and more particularly to an improved assembly in which the user can conveniently achieve wheel adjustment while remaining at the implement handle assembly remote from the wheels.

In the heretofore conventional implement such as tillers, the wheels could be adjusted for height only at their mounting with the implement base, thereby requiring the user to leave his position at the implement handle assembly and to stoop or kneel at the wheel assembly to adjust the wheel height.

SUMMARY OF THE INVENTION

The present height-adjusting assembly for the tiller wheels enables the user to remain at his conventional location at the handle assembly of the implement handle, and to adjust the wheel height at this location remote from the wheels by an elongate, remote control, wheel-adjusting handle.

The height-adjusting assembly for implement wheels includes an adjustment bar of the wheel means disposed adjacent a wheel-mounting bracket on the implement base, and an implement handle attached to the base and extending upwardly and rearwardly from the base. A locking means selectively interconnects the adjustment bar and bracket, and includes a remote control wheel-adjusting handle means movably mounted on the implement handle and having a manually-actuated portion remote from the connection of the bar and bracket for selectively fixing the wheel means at a predetermined adjusted height.

The locking means includes a lock pin movably mounted on the bracket and selectively connected to the bar, the wheel-adjusting handle means being operatively connected to the lock pin for selectively connecting the lock pin and bar.

More particularly, the wheel-adjusting handle means includes an elongate handle rod movably mounted on the implement handle and having one end connected to the lock pin, the other rod end providing the remote manually-actuated portion.

In the height-adjusting assembly, the bar includes a plurality of longitudinally spaced apertures, and the lock pin is selectively withdrawn from and inserted in the bar apertures upon movement of the elongate handle rod by the remote manually-actuated rod portion.

A resilient means is located between the bracket and lock pin, and tends to urge the pin into the bar apertures.

The implement handle includes a hand-gripping means at its upper end. The remote manually-actuated portion of the wheel-adjusting handle means is located adjacent the handgripping means of the implement handle, thereby enabling height adjustment of the implement wheels at the convenient remote location.

BRIEF DESCRIPTION OF THE DRAWINGS

FIG. 3 is a fragmentary rear elevational view, partly in cross section, of the height-adjusting assembly in unlocked condition.

DESCRIPTION OF THE PREFERRED EMBODIMENT

Figure 1:
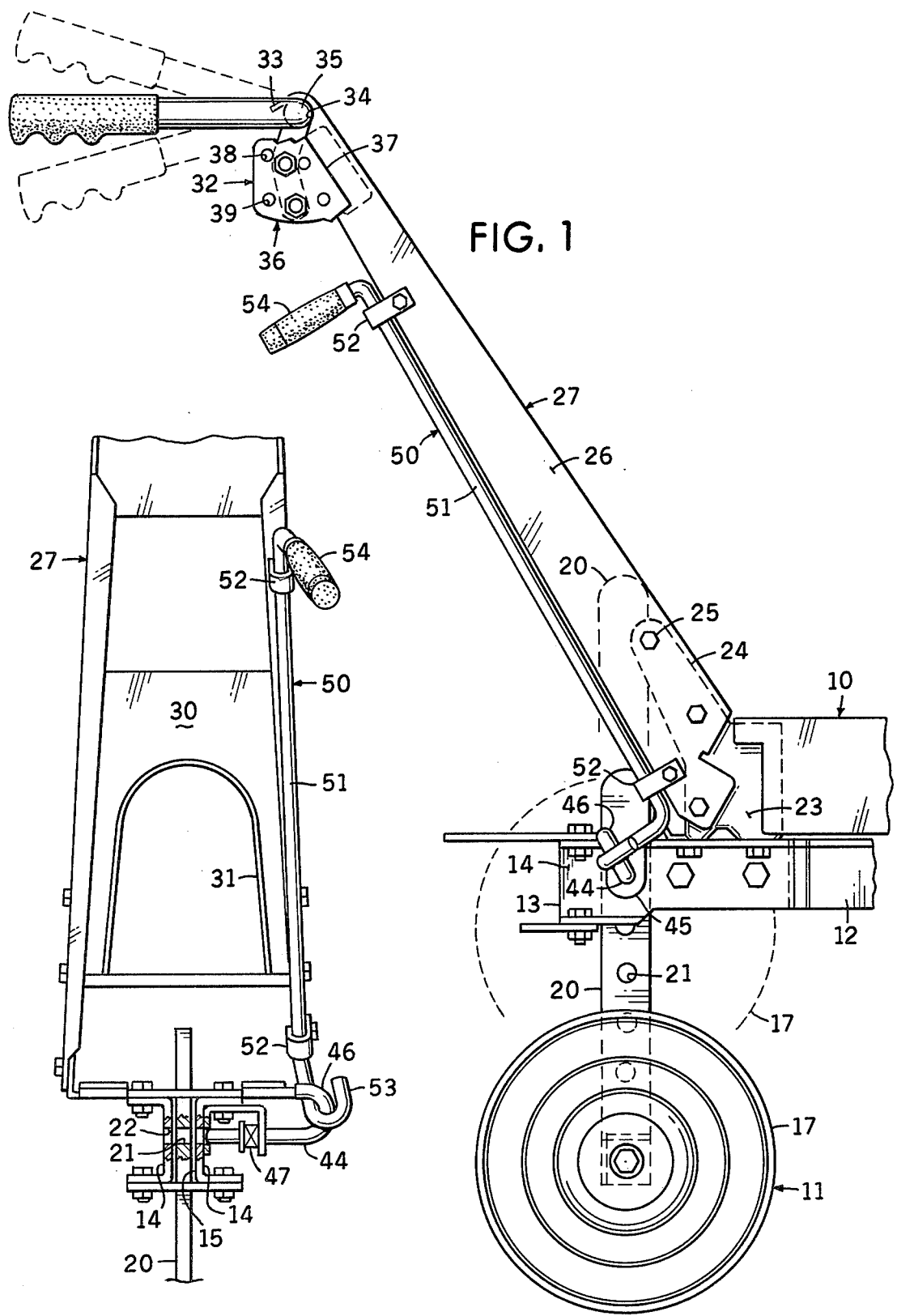
FIG. 1 is a fragmentary, side elevational view of the height-adjusting assembly for implement wheels, the wheels being shown in adjusted height position in broken lines.

Referring now by characters of reference to the drawings, and first to FIG. 1, the implement generally indicated by 10, on which the height-adjusting assembly is utilized, is a tiller. The power means and cultivating blades of the tiller are not shown because such is conventional and not pertinent to the present invention. The implement 10 includes a base 12 on which the power means and cultivating blades are mounted.

The adjustable wheel means referred to by 11 is attached to the rear end of the base 12 by a suitable wheel-mounting bracket 13, the bracket 13 being provided by a pair of laterally spaced channel plates 14 forming a socket 15 therebetween.

The wheel means 11 includes an axle sleeve 16 carrying a pair of ground wheels 17. A vertical adjustment bar 20 is fixed to the axle sleeve 16 and extends upwardly through the bracket socket 15. The bar 20 is provided with a series of regularly, longitudinally spaced apertures 21 that are selectively alignable with compatible apertures 22 formed in the laterally spaced channel plates 14 of the bracket 13, the purpose of which will be later described upon more detailed description of parts.

Figure 2:
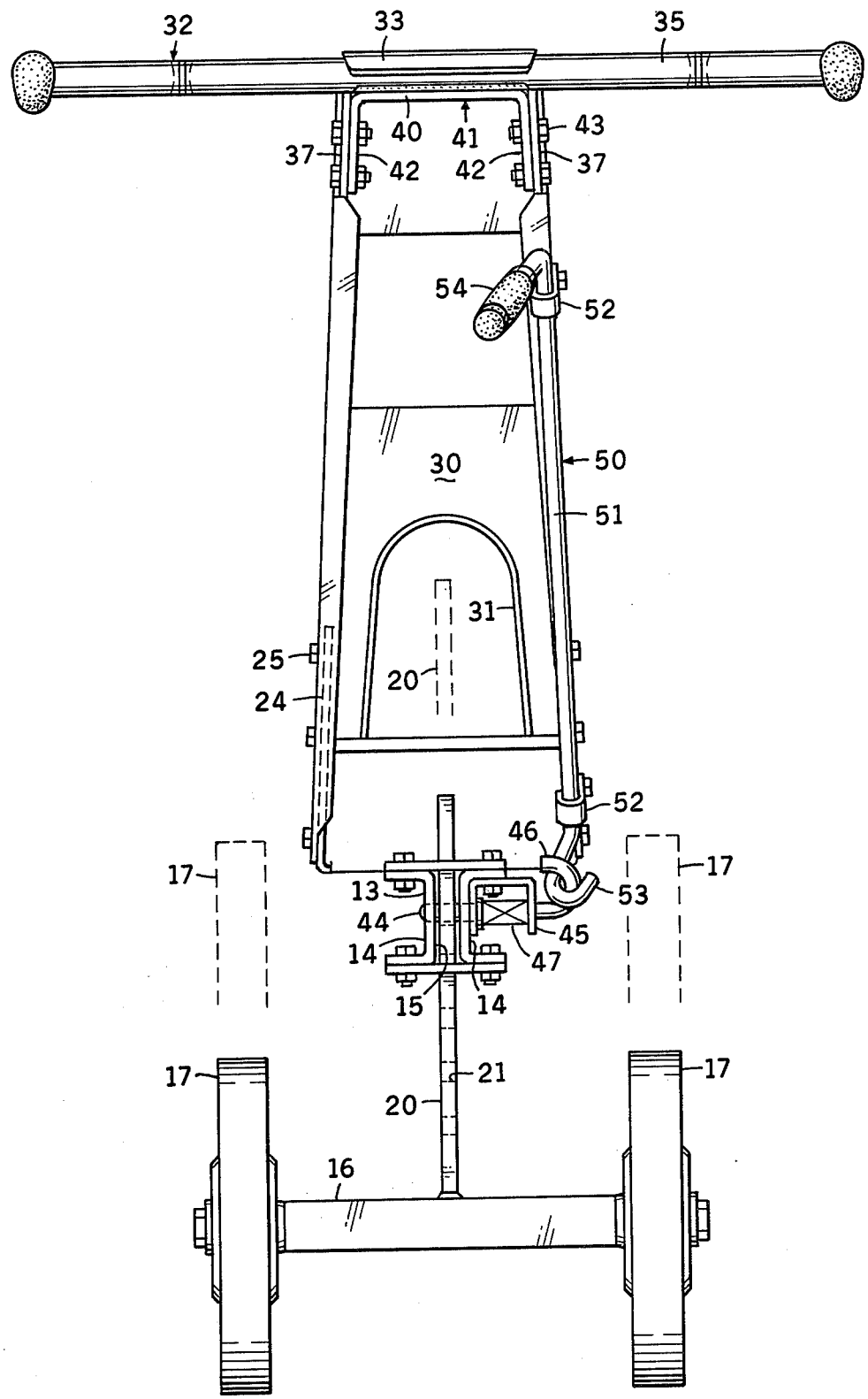
FIG. 2 is a rear elevational view of the height-adjusting assembly in locked position.

Secured at the rear of the implement base 12 is a mounting bracket 23 having upstanding side arms 24. Secured by bolts 25 to the side bracket arms 24 are the side flanges 26 of a handle panel generally indicated by 27 and constituting an implement handle. The handle panel 27 also includes a transverse web 30 between the side flanges 26, the web 30 including a lower opening 31 through which the adjustable wheel bar 20 may extend upon adjustment of the wheel height. The handle panel 27 has a generally upwardly tapering configuration as is best seen in FIG. 2. Further, the side flanges 26 of the handle panel 27 generally converge upwardly as is best shown in FIG. 1.

A hand-gripping means or handle bar assembly referred to by 32, is provided at the top of the implement handle, the web 30 of the handle panel 27 is provided with a curvilinear web end 33. Formed in the side flanges 26, adjacent the curvilinear panel web end 33, are recesses 34, the curvilinear web end 33 and recesses 34 providing a handle bar socket.

Located in the handle bar socket is a handle bar 35 that extends laterally beyond the panel side flanges 26. More particularly, the curvilinear panel web end 33 embraces one side of the handle bar 35, and the curvilinear margins, at least partially defining the recesses 34 in side flanges 26, embrace the other side of the handle bar 35, to define the rotative axis of the handle bar 35.

An adjustable connection referred to by 36, between the handle bar 35 and side flanges 26, enables the selective adjustment of the angular disposition of the handle bar 35 in its socket. This adjustable connection 35 includes bracket plates 37 fixed as by welding to the side flanges 26. Each of the bracket plates 37 is provided with a plurality of coacting bolt holes 38 and 39 located at different radii from the rotative axis of the handle bar 35.

Fixed to the handle bar 35, between the side flanges 26 and below the panel web 30 and curvilinear panel web end 33, is a web portion 40 of a substantially U-shaped bracket referred to by 41. The substantially U-shaped bracket 41 also includes a pair of laterally spaced arms 42 that extend forwardly into close adjacency with the inside surfaces of bracket plates 37. Each of the arms 42 is provided with a pair of longitudinally spaced bolt holes that are selectively alignable with different pairs of compatible bolt holes 38–39 formed in the bracket plates 37 at different angular positions of the handle bar 35. Bolt fasteners 43 extend through the selectively aligned arm holes and bracket plate holes 38–39 to secure the arms 42 to the bracket plates 37, and thereby retain the handle bar 35 in a predetermined angular position.

To adjust the handle bar 35 to a different predetermined angular position, the bolt fasteners 43 are detached and the handle bar 35 is rotated in its handle bar socket 34 about its rotative axis and as guided by the curvilinear margins of the recesses 34 and curvilinear panel web end 33, to align the bolt holes of the arms 42 with the desired pair of bolt holes 38–39 in the bracket plates 37. When located in the desired angular position, the bolt fasteners 43 are attached to secure the arms 42 to the bracket plates 37, and thereby hold the handle bar 35 in the adjusted predetermined angular position.

The locking means selectively interconnecting the adjustment bar 20 and the wheel-mounting bracket 13 includes a lock pin 44 that is selectively inserted through aligned plate apertures 22 and predetermined bar aperture 21, the lock pin 44 being slidably mounted by a U-shaped bracket 45 fixed to one of the channel plates 14. The lock pin 44 is provided with a hook end 46 located laterally outward of the U-shaped bracket 45. A compression spring 47, constituting a resilient means, is located between the lock pin 44 and one of the channel plates 14 through the bracket 45, and tends to urge the lock pin 44 inwardly through an aligned bar aperture 21 to effectively interconnect the bracket 13 and wheel adjustment bar 20.

A wheel-adjusting handle means generally indicated by 50 is movably mounted on the implement handle 27 and is operatively connected to the lock pin 44. The wheel-adjusting handle means 50 includes an elongate handle rod 51 rotatively mounted on one side flange 26 of the implement handle 27 by a pair of longitudinally spaced, mounted straps 52. The elongate rod 51 is provided with a lower hook end 53 that is operatively connected to the hook end 46 of the lock pin 44. The opposite end of the elongate rod 51 is bent to provide a remote, manually-actuated rod portion 54. More particularly, the remote, manually-actuated rod portion 54 is located closely adjacent the upper end of the implement handle 27 and closely adjacent the hand-gripping means 32.

To utilize the remote control handle rod 51, the remote rod portion 54 is simply gripped by the user while standing at the implement handle means 32, and is moved to rotate the control handle rod 51 so as to withdraw the lock pin 44 under the loading of compression spring 47 from its associated bar aperture 21, thereby releasing the upstanding wheel adjustment bar 20. Then, the unit including the base 12 and wheelmounting bracket 13 is raised or lowered to the desired wheel height, at which time the lock pin 44 will snap automatically under loading of spring 47 into the appropriate predetermined bar aperture 21 to latch the bar 20 securely. It will be understood that wheel height adjustment is attained readily by the remote control rod 51.

I claim as my invention:

1. A height-adjusting assembly for implement wheels, comprising:
   (a) a base including a wheel-mounting bracket,
   (b) an implement handle attached to the base and extending upwardly and rearwardly from the base and including hand-gripping means at the upper end,
   (c) wheel means including an adjustment bar disposed adjacent the bracket, the bar including a plurality of longitudinally spaced apertures, and
   (d) locking means selectively interconnecting the adjustment bar and bracket, and including:
      1. a lock pin reciprocatively mounted on the bracket and selectively interconnected with one of the bar apertures,
      2. a compression spring between the bracket and the lock pin tending to urge the pin into the selected bar aperture, and
      3. a wheel-adjusting handle means including an elongate rod rotatively mounted on its longitudinal axis on the implement handle, the elongate rod having one end connected to the lock pin, and having the other rod end located adjacent the hand-gripping means of the implement handle for rotating the elongate rod about its longitudinal axis for selectively withdrawing the lock pin from or inserting the lock pin in the bar apertures under loading of the spring to determine the adjusted wheel height.

* * * * *